Aug. 18, 1964  R. MILLER  3,144,749
TWO CYCLE SUPERCHARGED DIESEL ENGINE
Filed Nov. 26, 1956  3 Sheets-Sheet 2

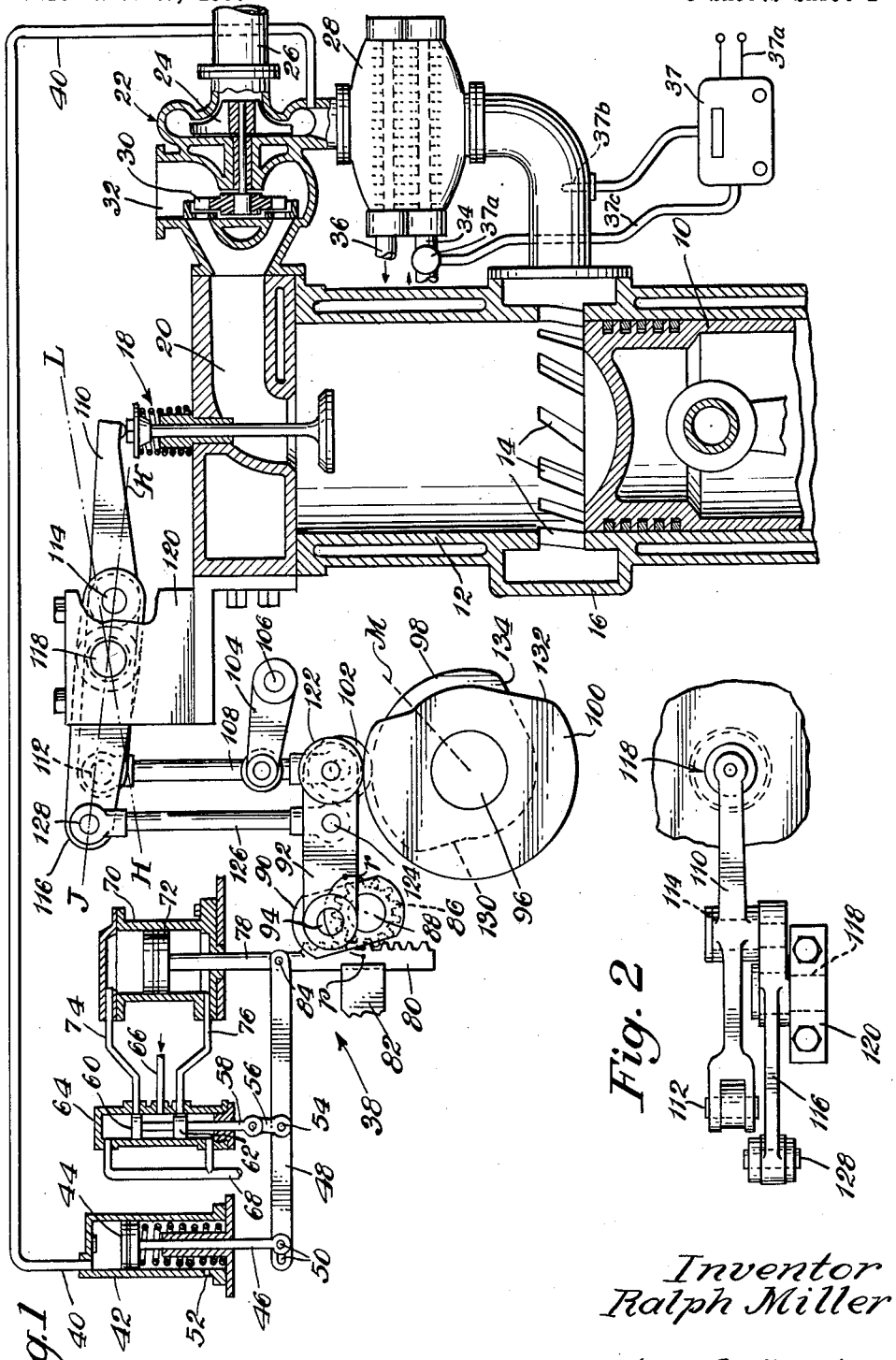

Inventor
*Ralph Miller* by *Parker & Carter*
*Attorneys*

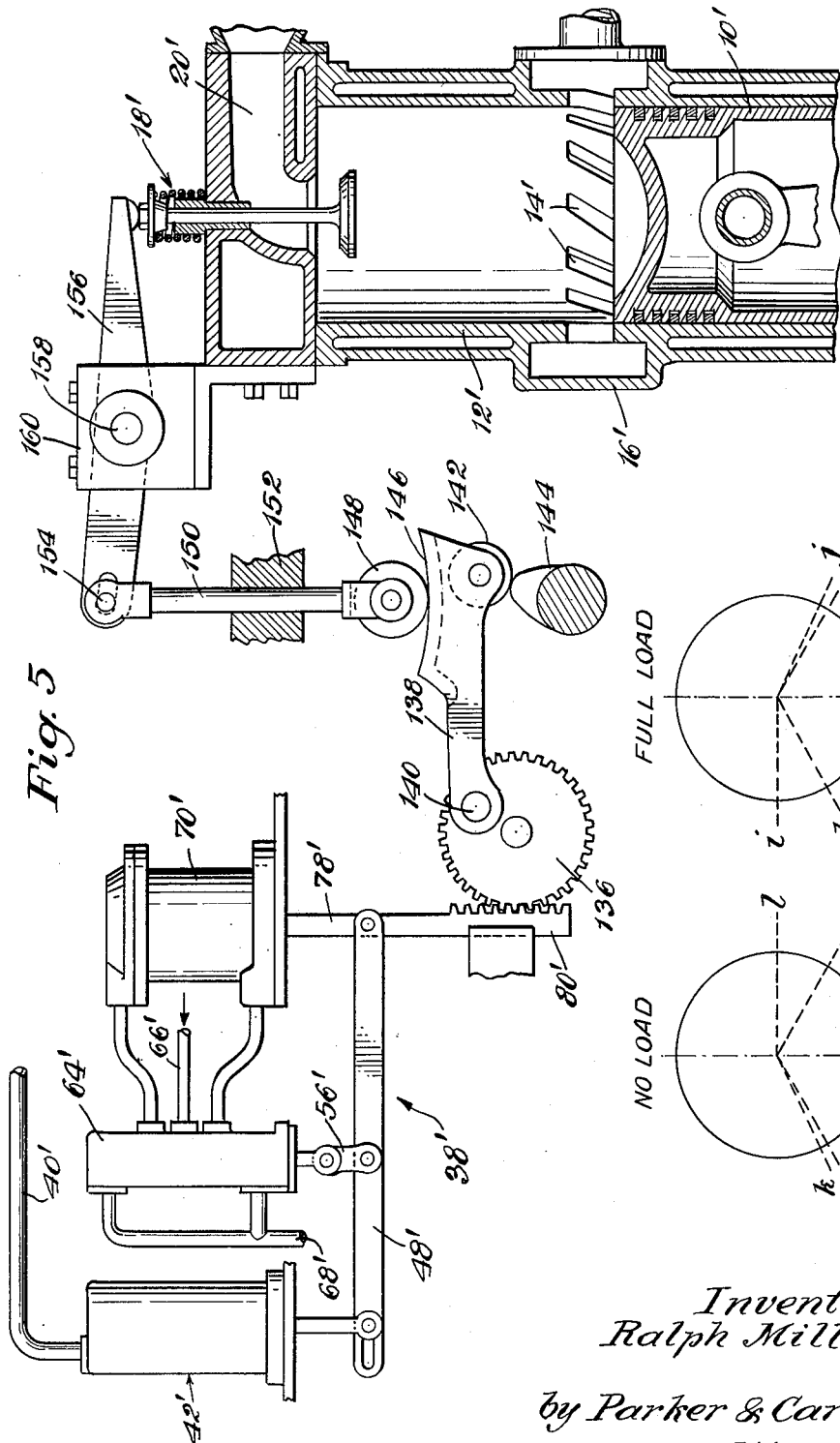

United States Patent Office 3,144,749
Patented Aug. 18, 1964

3,144,749
TWO CYCLE SUPERCHARGED DIESEL ENGINE
Ralph Miller, 1943 N. Summit Ave., Milwaukee, Wis.
Filed Nov. 26, 1956, Ser. No. 624,348
5 Claims. (Cl. 60—13)

This is a continuation in part of application Serial No. 398,579, filed December 16, 1953, now Patent No. 2,991,616, issued July 11, 1961, which was a continuation-in-part of application Serial No. 166,418, filed June 6, 1950, now abandoned.

My invention resides in the field of internal combustion engines and is an improved method and apparatus for obtaining an increased output from previously known engines.

Engine developers are continuously seeking new ways to increase the output of engines, either by new methods of operation or by the use of various auxiliary apparatus; and two primary factors always have to be considered, namely, excessive pressures and excessive temperatures in the cylinders during the engine cycle. For many years, the high pressures existing in the cylinders have been effectively dealt with by simply making an engine more sturdy, particularly in permanent installations. However, high temperatures constitute a more difficult problem as the materials of the engine will not stand temperatures above a certain upper limit, regardless of the sturdy construction of the engine. This problem has proved especially difficult on two-stroke cycle engines for the reasons to follow.

One well-known method of increasing the output of a two-stroke cycle internal combustion engine is by the addition of a supercharger which compresses the inlet air to an elevated temperature and pressure before it passes into the cylinders through the scavenging ports, thus increasing the density of the air and allowing for the burning of a greater quantity of fuel. This increases the output of the engine generally in proportion to the increased density of the air, but it suffers the disadvantage of increasing the mechanical loads on the engine, due to the increased pressures, and it increases the thermal loads, due to the increased temperature of the inlet air. A highly supercharged engine must therefore be sturdier than its non-supercharged equivalent.

The temperature of the intake air from a supercharger to the scavenging ports is even more important than the pressures. If the engine operates at high supercharging pressures, the temperature of the charging air will be higher. This causes the compression temperature of the air at the end of the compression stroke to be higher, and the final combustion temperature will also be higher. It can be seen that by using a supercharger all temperatures in the engine cycle will be increased and the thermal stresses on the engines can easily become excessive if the supercharging pressure is raised beyond a certain upper limit.

Because of these excess temperatures, it is desirable to remove the excess heat from the charging air to lower its temperature, and this has been done by the use of various types of intercoolers, all of which cool the charging air before it enters the cylinedrs through the scavenging ports. Many types of intercoolers are well known, and they have been used effectively to decrease the thermal loads on highly supercharged engines.

I have devised a method and apparatus for compressing the inlet air by a supercharger, preferably a turbocharger, cooling the air to an approximately constant temperature for all loads on the engine, supplying the cooled compressed air to the cylinder through all of scavenging ports in the cylinder wall between an expansion and compression stroke when the piston has uncovered the ports, providing an exhaust valve in the cylinder head to exhaust all of the burnt gases from the cylinder, and varying the time of closing of this exhaust valve after the piston has covered the scavenging ports so that the temperature rise in the cylinders due alone to compression will vary inversely as the load. To do this, the time of closing of the exhaust valve in the cylinder head must be advanced during the engine cycle as the load decreases and retarded as the load increases. Thus, a larger temperature rise, due to the burning of the fuel, can be allowed while the final combustion temperature can remain below the allowable upper limit and a greater total weight of air is entrapped due to the lower final compression temperature. In summary, more fuel can be burned, and such a two-stroke cycle engine will have a higher output.

From the above, it can be seen that one of the primary objects of my invention is a new method of operating a given sized two-stroke cycle engine that will substantially increase its output without increasing its mechanical or thermal loads.

Another object is a new method of operating a given sized two-stroke cycle engine that will substantially increase its output which does not require a substantial redesigning of the engine.

Another object is a new method of operating a given sized two-stroke cycle engine that will substantially increase its output by the use of conventional auxiliary equipment, such as superchargers, intercoolers, modified cylinder heads, and the like, all of which are individually old and well known.

Other objects will appear from time to time in the ensuing specification and drawings, in which:

FIGURE 1 is a transverse section of the two-stroke cycle engine with various auxiliary apparatus, all of which in combination makes up my invention;

FIGURE 2 is a plan view of the valve actuating mechanism shown in FIGURE 1;

FIGURE 5 is a transverse section of a variant form;

FIGURE 6 is a typical valve timing diagram at no load for the FIGURE 5 form; and FIGURE 7 is a typical valve timing diagram at full load for the same.

Figure 4:
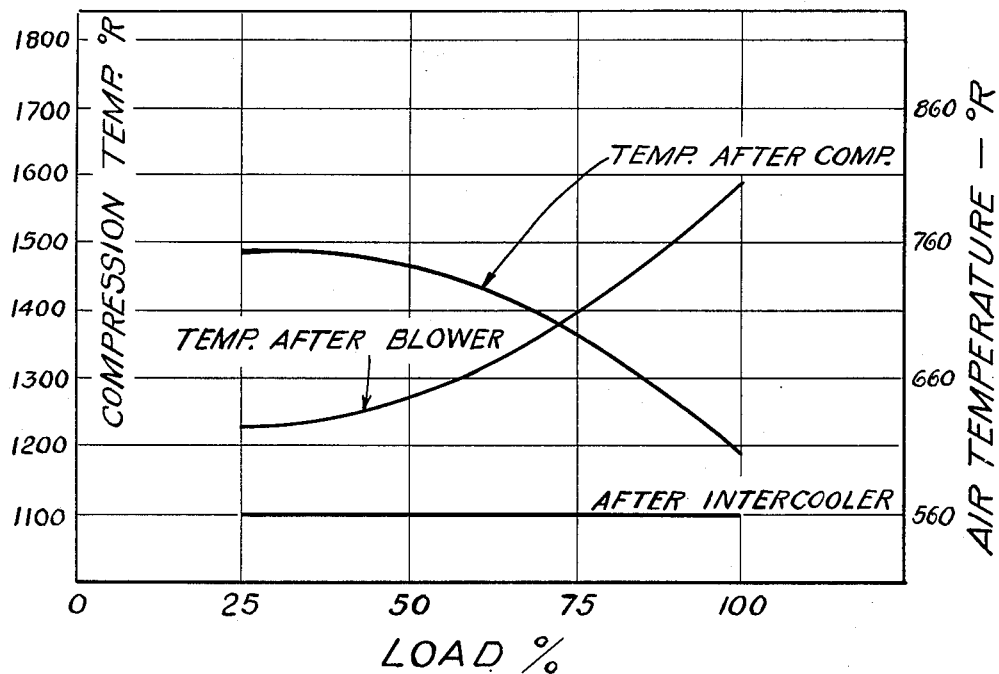
FIGURE 4 is a chart or diagram showing the various temperatures in my engine for a complete range of load.

In FIGURE 1, I have shown a two-stroke cycle engine of the uniflow type having a piston 10 and a cylinder 12. The cylinder has a collection of scavenging ports 14 that are spaced all the way around the cylinder with the usual scavenging belt 16. In the head of the piston is an exhaust valve mechanism 18 which controls an exhaust port 20. A turbocharger 22 has a blower or compressor 24 which draws air into an inlet 26 and discharges it under high pressure to an intercooler 28 where it is cooled to an approximately constant temperature for all loads. From the intercooler the charging air passes to the scavenging belt and the scavenging ports 14. An exhaust turbine 30 is driven by the exhaust gases from the cylinder and any conventional exhaust outlet 32 is provided. The piston is shown in a position where it allows scavenging air from the scavenging belt 16 to flow into the cylinder through the scavenging ports 14.

The intercooler 28, as stated above, is the type that gives a constant temperature for the charging air for all loads on the engine, and the cooling fluid has an inlet connection, indicated generally at 34, adjacent the cold air outlet, and an outlet 36 adjacent the warm air inlet. To maintain a constant inlet temperature of the inlet air from the intercooler, I may control the intercooler in any suitable manner. For example, I may have a controller 37, either air or electrically operated, in this case electrically. The controller may be supplied with current by a suitable connection 37a. A temperature sensing probe 37b may be positioned in the inlet manifold or inlet connection between the intercooler and the engine. The controller senses the temperature of the air after the intercooler, and if it varies from a predetermined temperature, a signal is sent by a suitable lead 37c to a solenoid control valve 37d in the inlet connection 34 to the intercooler. The controller, thus, automatically increases or reduces the amount of water, or whatever cooling medium is used, in the intercooler to keep the temperature of the air to the engine approximately constant. I have shown the controller as electrically operated, but it should be understood that air operated controllers are quite conventional. In the case of an air operated unit, the temperature probe would sense the inlet manifold temperature and the controller would increase or decrease the pressure of an air signal to an air motor which in turn would open or close the valve in the inlet line 34. This is to say that any suitable arrangement for controlling the intercooler so that it automatically supplies a constant temperature charging air to the cylinder may be used.

A valve control mechanism, indicated generally at 38, is one of many that could be used or could be made to function in this manner, and the specific details form no part of this invention. The details of the one illustrated are as follows: The pressure of the air between the blower 24 and the intercooler 28 will be proportioned to the load, and a pipe 40 conveys this variable pressure to a cylinder 42 so that the pressure acts against a spring loaded piston 44. If the pressure is high (at full load), the piston 44 will be forced downwardly, and if the pressure is low (at light load), the piston will move upwardly. A piston rod 46 on the piston 44 is connected to a link 48 through a pin and slot connection 50. The lower side of the piston 44 is vented to the atmosphere at 52. The link 48 is pivotally connected at 54 to a link 56 which is pivotally connected to the stem 58 of a pair of piston valves 60 and 62 which reciprocate in a cylinder 64. A source of high pressure hydraulic fluid is in communication with the cylinder 64 through any suitable connection, indicated generally at 66, and the high pressure hydraulic fluid is admitted between the piston valves 60 and 62. A fluid discharge 68 has branches connected at both ends of the cylinder so that hydraulic fluid from the system can be returned to the low pressure side of the fluid system. Another cylinder 70 with a piston 72 has appropriate pipe connections 74 and 76 to the cylinder 64 so that both sides of the piston 72 are selectively in communication with the high pressure hydraulic source through the cylinder 64. The piston rod 78 for the piston 72 has a rack 80 formed at its lower end to reciprocate in any suitable guide means 82, and the link 48 is also pivoted to the piston rod 78 at 84. The rack is in meshing engagement with a pinion 86 which is mounted on a shaft 88. This shaft carries a crank 90 which is connected to a rocker arm 92 by a pivot 94. When the valve 18 is open the gases in the cylinder are allowed to escape through it at a rate that gives the desired compression ratio. Nor is the valve 18 opened too wide so that the pressure in the cylinder will drop below the supercharging pressure.

Figure 3:
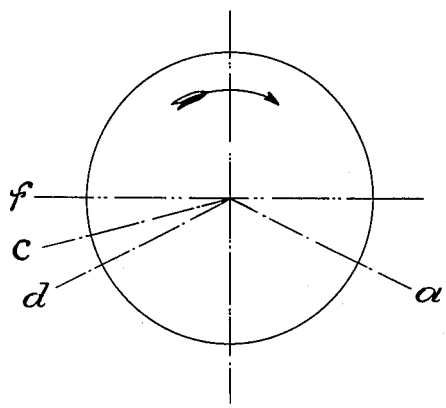
FIGURE 3 is a valve timing diagram for the exhaust valve for the engine in FIGURE 1.

A cam shaft 96 is driven from the engine crank shaft in a conventional manner and is fitted with a valve opening cam 98 and a valve closing cam 100. A cam follower roller 102 bears on the cam 98, being held in that position by a pair of rocker arms 104 which are arranged to oscillate on a shaft 106. A connecting rod 108 is attached to a valve lever arm 110 by a pivot 112. The arm 110 oscillates on a journal 114 which is integral with a lever 116, the latter being free to oscillate on a journal 118 carried on a fixed bracket 120. A cam follower roller 122 bears on the cam 100 and is carried on the rocker arm 92. This rocker arm oscillates on the pivot 94 carried on the crank 90. The other end of the arm 92 is connected by a pivot 124 to a connecting rod 126, the upper end of which is connected to the lever 116 by a pivot 128. FIGURE 3, line a, indicates the angular position of the crank at which the upward portion 130 of the cam 98 starts to move the follower roller 102 upwardly to open the valve 18 at the end of the expansion stroke of the piston. The journal 114 on the lever 116 is in its lowermost position on line J—K in FIGURE 1, while the cam follower roller 122 is on top of the circular part of the cam 100.

With the pivot 94 on the crank 90 in the mid-position, as shown in FIGURE 1, rotation of the cam shaft 96 will cause the roller 122 to drop to the base circle of the cam 100 when the line M is vertical. This movement will raise the journal 114 on the lever 116 to a position indicated by the line H—L. The valve-actuating end of the lever 110 is thus lifted away from the valve 18 so that it is closed by its spring in a conventional manner.

With the pivot 94 in the mid-position as shown, the valve 18 will close at c in FIGURE 3. By rotating the crank 90, the pivot 94 can be advanced to the position p, causing the valve 18 to close at d, see FIGURE 3, which is the position in which the piston closes the scavenging ports 14 in FIGURE 1. This is the no-load position. If the crank 90 is rotated in the opposite direction so that the pivot 94 is placed in the position r, the valve will close later in the upstroke of the piston as at f in FIGURE 3, this being the full-load position. The line a indicates the opening of the valve 18 and shortly thereafter the piston uncovers the inlet ports 14.

When the cam follower roller 122 is lifted again by the upward portion 132 of the cam 100, the roller 102 is moved downwardly at the same rate, possibly shortly thereafter following the downward portion 134 of the cam 98. The valve 18 thus remains closed until the upward portion 130 lifts the roller 102.

The shaft 88 could be controlled by any factor of the engine indicative of the load—for example, by the fuel pump or the governor. The shaft 88, however, is most easily operated automatically to vary the closing angle of the valve 18 in accordance with the supercharging air pressure by mechanism similar to the automatic control mechanism 38 in FIGURE 1.

As the load increases, the time of closing of the valve or valves will be retarded during the engine cycle, and it will close later toward the line f in FIGURE 3. As the load decreases, the time of closing of the valve will be advanced during the engine cycle and it will close earlier toward the line d in FIGURE 3. The valve stays open after the piston has closed the inlet ports so that a part of the inlet air normally entrapped in the cylinder is exhausted to the exhaust manifold or to the outlet. The piston opens the inlet ports at a in FIGURE 3 on the power stroke and covers them again at d.

In FIGURE 4, I have illustrated the temperature in my engine for a full range of loads. Three very important aspects of the invention can be observed from this chart: First, the temperature of the entering air after the turbocharger (TEMP AFTER BLOWER) is much higher in my engine than in a conventional engine at the higher loads; second, the temperature of the entering air after the intercooler (AFTER INTERCOOLER) is approximately constant for all loads; and third, the temperature of the air at the end of compression (TEMP AFTER COMP), which is just prior to combustion, in my engine decreases as the load increases. It can therefore be seen that a greater temperature rise due alone to the burning of the fuel can be accomplished in my engine than in a conventional engine as the load increases without exceeding the upper temperature limits of the material, because in my engine the temperature of the air at the time of fuel injection (TEMP AFTER COMP) is lower than in a conventionally supercharged engine. Obviously then, if more fuel can be burned, more load can be carried. At least equally as important, a greater weight of air is entrapped due to its lower temperature.

In FIGURE 5, I have shown a variation in which many parts are similar. For example, the engine has a piston 10' and cylinder 12', inlet ports 14' around the wall of the cylinder enclosed by a scavenging belt 16', an exhaust valve 18' in the cylinder head controlling an exhaust port 20' supplying the exhaust gases to an exhaust driven supercharger, not shown. The compressor, not shown, of the supercharger compresses the air and supplies it to an intercooler, not shown, which supplies the compressed cool air to the scavenging belt 16', all similar to the previous form.

A suitable pipe or lead 40' communicates the pressure of the manifold air to a servo mechanism 38' having a cylinder 42' with a piston therein moving a lever 48'. A link 56' is connected to the valve piston in a cylinder 64' which controls the supply of hydraulic fluid from a source 66' to a cylinder 70' with a discharge at 68'. The piston rod 78' from the cylinder 70' moves a rack 80', the operation being substantially the same, to this point, as the control shown in FIGURE 1.

The rack 80' engages a pinion 136 which has a crank arm 138 pivoted to it at 140 so that the arm may be moved back and forth in response to the rotation of the pinion. The lower surface of the crank arm has a follower 142 which bears against a camshaft 144 and the upper surface 146 bears against a follower 148 on the end of a push rod 150 passing through suitable guides 152 and loosely pivoted at its upper end at 154 to a rocker arm 156 pivoted at 158 on a suitable support 160, the rocker arm actuating the valve 18'.

In response to the manifold pressure, the crank arm 138 will be moved back and forth varying both the time of opening and closing of the exhaust valve 18' and the upper surface 146 of the arm and is designed to maintain an approximately constant tappet clearance.

In FIGURES 6 and 7, I have shown a typical timing diagram. The end of the normal expansion stroke $g$ in both FIGURES 6 and 7 is the point when the piston uncovers the ports 14', and the beginning of the normal compression stroke $h$ is the point when the piston covers the ports during its compression stroke. At full load, the arm 138 is positioned by the servo mechanism so that during the compression stroke the valve 18' closes late, as at $i$, and is opened late as at $j$, which may coincide with the point $g$ when the piston uncovers the inlet ports. Thus, at full load the piston has a long effective expansion stroke and a short effective compression stroke.

At no load, the arm 138 is moved by the servo mechanism in response to the lower pressure of the inlet manifold so that the valve 18' closes earlier as at $k$, giving a long effective compression. But the time of opening of the valve has been advanced to the point 1 so that the expansion stroke is shortened. Thus, at no load the effective compression is long and the effective expansion is short, which is the reverse of the full load condition. The advantage is that at no load the effective compression is large, which gives a higher temperature at the end of compression to ignite the fuel. Additionally, the effective expansion is short so that the energy of the gases in the cylinder is released to the exhaust manifold, thereby supplying additional energy to the turbine. As the engine comes up in load, both the time of opening and closing of the valve 18' will be retarded so that the effective compression gets shorter and the expansion gets longer. The supercharger no longer needs the extra energy tapped from the cylinder because it has already come up to speed and has overcome its flywheel effect or inertia. At the same time, the compression is reduced in the cylinder so that the final compression temperature will drop as load increases according to FIGURE 4. At the same time that compression is reduced, expansion is increased, so that more power is delivered to the crankshaft. At full load a full expansion is acquired by opening the valve 18' at approximately the same time that the piston uncovers the inlet ports.

One of the advantages of this embodiment is that by merely shifting the arm 138 back and forth by any suitable control mechanism that responds to load variations, both the time of opening and closing may be either advanced or retarded depending upon whether the load is rising or falling and the effective compression and expansion will be reciprocals of each other.

The use, operation and function of my invention are as follows:

I provide a supercharged engine and a method of operating it which allows more fuel to be burned in the cylinders as the load increases and the mean effective pressure in the cylinders to be increased without the safe upper limits for the maximum combustion temperature and pressure being exceeded.

The total pressure that makes up the final compression pressure in the cylinders is acquired in two steps or stages, the first in the compressor 24 of the exhaust driven supercharger and the second in the cylinder by the piston 10. Present commercial supercharged two-cycle engines use superchargers which have a pressure ratio of approximately 1.3 to 1.4 at full load. The total combined pressure ratio of the supercharger and engine amounts to approximately 45.

One of the important points of my invention is that I have shifted a part of the total compression from the second stage to the first stage. One of the major consequences of this step is that the so-called shifted amount of compression is now ahead of the intercooler 28. Therefore a larger portion of the total compression is ahead of the intercooler, and more of the temperature rise of the total compression may be removed by the intercooler. In practice, I find it desirable to use a larger intercooler than normal.

In effect, I decrease the amount of effective compression performed in the cylinder by varying the time of closing of the valve 18, either from no load to full load or from a certain part load, for example half load, up to full load. In any event, at full load the compression ratio is reduced, for example to approximately 6 to 1. At the same time, I increase the pressure ratio in the supercharger to an amount greater than normal practice, for example up to 2 or 3 to 1. The pressure rise in the cylinder is decreased and the pressure rise in the blower or compressor 24 is increased. The total may still remain the same.

The importance of this shift is that the intercooler is positioned between the two compression stages. Since a larger portion of the total pressure rise now takes place in the first stage, in the compressor 24, the outlet temperature of the air supplied from the compressor to the intercooler is substantially higher than normal.

An intercooler can only reduce the temperature of the air supplied to it a certain amount. For example, it cannot be reduced below the temperature of the available water supply. But the higher the temperature of the air coming to the intercooler, the more heat that can be taken out in the cooling water in reducing the temperature of the air in the intercooler to the lowest possible figure.

In my invention, because the outlet air temperature from the supercharger is substantially higher, the size and capacity of the intercooler is increased. I therefore reduce the temperature of the air passing through the intercooler to as low a figure as possible. For example in practice, I find it convenient to reduce the temperature of the air to 100° F.

In practicing my invention, three temperatures should be taken into consideration in determining the minimum compression ratio used in the cylinder and therefore in determining the time of the closing of the valve 18. These are; first, the outlet temperature of the air from the intercooler; second, the temperature rise of the air in the cylinder due alone to compression by the piston; and, third, the temperature rise of the air due to heat transfer from the cylinder walls. These three, when added together, should give a temperature that at least slightly exceeds the ignition temperature of the fuel.

Several important characteristics of my invention are that I use a higher pressure ratio across the exhaust driven supercharger than normal. I use a larger intercooler than normal to withdraw more heat from the air on the outlet side of the supercharger. I also use a smaller compression ration in the cylinders at full load by delaying the time of closing of the valve 18. By this, the entrapped volume of air in the cylinder is reduced at the higher loads. Nevertheless the air being supplied to the cylinder at the full load is at a higher pressure, for example 30 p.s.i.a., but still at the same temperature, for example 100° F. This air being supplied to the cylinder is much more dense than normal. Therefore, the total weight of the air entrapped in the cylinders at the higher loads and at full load will be much greater than the weight of air entrapped at no load and the light loads, even though the volume is substantially reduced. Another way of saying this is that the supercharger and intercooler supply higher pressure denser air and between them "crowd" a greater weight of air into a smaller volume in the cylinder.

One of the major advantages of my invention is that it is not necessary to redesign present uniflow two-cycle engines. It is sufficient to merely add to such engines the elements and features set forth above. All of the individual elements or parts are well known and therefore easily obtainable. The fact that mechanical loads and thermal loads are at least unchanged or possibly reduced, compared to less powered conventional engines to which the invention may be applied, allows present-day designs and engine elements to be used. In short, I can apply my invention to a conventional two-cycle uniflow engine and obtain substantially more horsepower output without major revisions.

Another important point is that ignition is facilitated by my invention. It should be remembered that ignition is facilitated by temperature as well as density. Thus, creating a high density charge by extensive intercooling without exceeding the maximum compression pressure allowed, creates an air condition at the end of the stroke with the same ignition qualities over the same load range. At the same time, I use a larger compression ratio in the proportion allowed by the higher density. In other words, a lower compression temperature can be used but at the same time I obtain the same ignition quality as with the higher compression.

As an example of the operation of an engine according to my invention, the following figures are given:

The compression pressure is in effect obtained by two stage compression.

The first stage compression takes place in the compressor of the turbocharger unit. The second stage compression takes place in the engine cylinder.

The combined pressure ratio of the two stage compression may be from atmospheric pressure to 665 p.s.i.a.

$$(650 \text{ p.s.i.g.}) \text{ or } \frac{665}{14.7}=45.2$$

At low engine loads, the turbocharger delivers air at a low pressure, say 21.0 p.s.i.a. (7 p.s.i. gauge). This is a pressure ratio of $$\frac{21.0}{14.7}=1.43$$

and with an intake temperature of, say, 90° F. (550° R.), the discharge temperature will be 163° F. (623° R.). In the intercooler, this temperature is reduced to 100° F. (560° R.) before it enters the engine cylinder.

The engine cylinder operates at maximum compression ratio at this engine load and the air which enters the cylinder at 21.0 p.s.i. and 560° R. is compressed to 665 p.s.i.a (650 p.s.i. gauge). This compression pressure is now $$\frac{665}{21.0}=31.7$$

The temperature rise due to this pressure rise is 920° F. so that the compression temperature is 1020° F. (1480° R.).

When the load on the engine is increased, the air pressure delivered by the turbocharger increases until at full load it may be 44.1 p.s.i.a. (29.4 p.s.i.g.). This is a pressure ratio of $$\frac{44.1}{14.7}=3.0$$

and the air temperature will now be 342° F. (802° R.). I assume an adiabatic compressor efficiency of 80%.

In the intercooler this temperature is reduced to 100° F. (560° R.) so that the air enters the engine cylinder at 44.1 p.s.i.a. (29.4 p.s.i.g.) and 100° F. (560° R.).

By holding the valves 18 open, the effective compression ratio in the cylinder is reduced so that the air is compressed from 44.1 p.s.i.a. to 665 p.s.i.a. as before. This is a pressure ratio of $$\frac{665}{44.1}=15.1$$

The temperature rise due to this pressure rise when $T=560°$ R. is 635° F. so that the compression temperature is now 735° F. (1195° R.).

Now if no intercooling had been used, the air would have entered the cylinder at 44.1 p.s.i.a. and 352° F. (812° R.) and the compression temperature would have been 1270° F. (1730° R).

Since the weight of the air varies inversely as its absolute temperature, the cylinder with intercooling contains at the end of the compression stroke 45% greater weight of air $$\left(\frac{1730}{1195}=1.45\right)$$

than it would without intercooling at these pressures.

This means that at the same air to fuel ratio, 45% more fuel can be injected and burned.

The above is given merely as an example to illustrate the important new result of my invention.

The combination of the valve timing for valve 18 to provide a reduced effective compression along with intercooling is important. Without intercooling, the mechanism and thermal loads increase, even with the above valve timing. Without the valve timing, but with intercooling, the same is also true. In a sense, the combination of these two features effects a shift of compression from the cylinder to the supercharger where the shifted compression is ahead of the intercooler.

While I have shown and described the preferred form of my invention, it should be understood that numerous modifications, substitutions, alterations and changes may be made without departing from the invention's fundamental theme. I therefore wish that the invention be unrestricted except as by the appended claims.

I claim:

1. In a supercharged, intercooled, two-stroke cycle, uniflow, compression ignition engine, having a cylinder with inlet ports around the cylinder wall and at least one exhaust valve for the cylinder head, a method of operating such an engine so as to increase the total weight of air in the combustion chamber without increasing the final combustion pressure and temperature above a predetermined maximum: including the steps of increasing the compression effected in the supercharger at full load to a selected compression ratio above those normally used, for example a pressure ratio of 2 to 1 or above, so that the outlet temperature of the air from the supercharger will be higher than normal; increasing the amount of heat withdrawn by the intercooler over the amount of heat normally withdrawn by reducing the outlet temperature of the air from the intercooler to an approximately constant value for all loads, for example approximately 100° F.; and reducing the compression effected in the cylinder to a selected compression ratio below that normally used, for example to a ratio of approximately 8 to 1, that provides a pressure rise that does not exceed the predetermined maximum final compression pressure when added to the pressure rise in the supercharger, and that also provides a corresponding temperature rise that does not exceed the predetermined maximum final compression temperature when added to both the approximately constant temperature of the outlet air from the intercooler and also to the temperature rise due to heating of the air by the cylinder walls.

2. A method of operating a two-stroke cycle, uniflow, compression ignition engine, having a cylinder with inlet ports around the cylinder wall and one or more exhaust valves for the cylinder head, with a selected fuel over a selected load range, so as to reduce the final compression temperature, and therefore the thermal load, as much as possible at the higher loads within the range: including the steps of precompressing the inlet air for the engine outside of the cylinders; varying the pressure rise and temperature rise in the precompressing step in direct relation to the load on the engine within the selected range; cooling the inlet air without changing its pressure, after the precompressing step, to a substantially reduced temperature regardless of the temperature rise in the air caused by the precompressing step; supplying the compressed cooled air to the cylinder through the inlet ports; varying the effective compression ratio of the engine in inverse relation to the load within the selected range by retarding the time of closing of at least one of the exhaust valves as the load increases and advancing the time of closing as the load decreases, so that both the pressure rise and temperature rise, due alone to compression in the cylinder by the piston, will vary in inverse relation to the load within the selected range; injecting a quantity of selected fuel into the cylinder around top dead center of the piston at all loads within the range in amounts that vary in relation to the load; establishing a maximum effective compression ratio, by closing all of the exhaust valves, for the minimum load within the range such that the substantially reduced temperature of the cooled air after the cooling step plus the temperature rise of the air in the cylinder, due alone to compression, will produce a final compression temperature, when starting the engine and running at light loads, that is in excess of the ignition temperature of the selected fuel; and further establishing a minimum effective compression ratio, by closing all of the exhaust valves, for the maximum load within the range, and for all higher loads, such that the substantially reduced temperature of the cooled air after the cooling step plus the lesser temperature rise of the air in the cylinder, due alone to the decreased compression, when added to the temperature rise due to heat received by the air in the cylinder from the cylinder walls, will produce a final compression temperature that is close to but still in excess of the ignition temperature of the selected fuel.

3. The method of claim 2 further characterized in that the cooling step involves reducing the temperature of the inlet air to an approximately constant value at all loads within the selected range.

4. The method of claim 2 further characterized by and including the step of utilizing the energy in the exhaust gas from the engine to perform the step of precompressing the air outside of the cylinder so that the pressure rise and temperature rise in the precompressing step will automatically vary in direct relation to the load on the engine within the selected range.

5. A method of operating a two-stroke cycle, supercharged, intercooled, uniflow, internal combustion engine, having inlet ports around the cylinder wall and one or more exhaust valves for the cylinder head, over a selected load range to reduce its thermal load without increasing its pressure load, and at the same time to increase the ignition qualities of the air in the cylinder at the maximum load within the range: including the steps of transferring a portion of the effective compression from the cylinder to the supercharger, while maintaining the total effective compression of both the cylinder and supercharger at least no greater than normal, by reducing the effective compression in the cylinder a substantial amount at full load and increasing the effective compression in the supercharger a material amount so that the portion of the total effected compression transferred is ahead of the intercooler; withdrawing the heat of compression in the intercooler from the compressed air, due both to the normal compression effected in the supercharger as well as the additional compression effected in the supercharger due to the transfer of compression from the cylinder to the supercharger; and varying the amount of transferred compression in direct relation to the load so that as the load rises within the selected range the amount of compression transferred will increase and vice versa and, at the same time maintaining the total effective compression in the engine and supercharger no greater than originally.

References Cited in the file of this patent

UNITED STATES PATENTS

| | | |
|---|---|---|
| 1,371,444 | Sherbondy | Mar. 15, 1921 |
| 2,097,883 | Johansson | Nov. 2, 1927 |
| 2,292,233 | Lysholm | Aug. 4, 1942 |
| 2,293,548 | Johansson | Aug. 18, 1942 |
| 2,401,188 | Prince | May 28, 1946 |
| 2,509,246 | Ramsey | May 30, 1950 |
| 2,670,595 | Miller | Mar. 2, 1954 |

FOREIGN PATENTS

| | | |
|---|---|---|
| 566,531 | Great Britain | Jan. 3, 1945 |
| 629,850 | Great Britain | Sept. 29, 1949 |